United States Patent
Hu (10) Patent No.: US 11,444,998 B2
(45) Date of Patent: Sep. 13, 2022

(54) BIT RATE REDUCTION PROCESSING METHOD FOR DATA FILE, AND SERVER

(71) Applicant: Tencent Technology (Shenzhen) Company Limited, Shenzhen (CN)

(72) Inventor: Yajun Hu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 16/504,789

(22) Filed: Jul. 8, 2019

(65) Prior Publication Data

US 2019/0334968 A1    Oct. 31, 2019

Related U.S. Application Data

(63) Continuation of application No. PCT/CN2017/115179, filed on Dec. 8, 2017.

(30) Foreign Application Priority Data

Apr. 20, 2017    (CN) .......................... 201710262437.6

(51) Int. Cl.
*H04L 65/613*    (2022.01)
*H04L 51/04*    (2022.01)
(Continued)

(52) U.S. Cl.
CPC .......... *H04L 65/613* (2022.05); *H04L 51/04* (2013.01); *H04L 51/52* (2022.05); *H04L 67/01* (2022.05); *H04L 67/06* (2013.01)

(58) Field of Classification Search
CPC ..... H04L 65/4092; H04L 67/06; H04L 67/42; H04L 51/04; H04L 51/32
(Continued)

(56) References Cited

U.S. PATENT DOCUMENTS 5,956,724 A * 9/1999 Griffiths .............. H03M 7/3088
9,503,401 B1 * 11/2016 Donohue ............. H04L 51/043
(Continued)

FOREIGN PATENT DOCUMENTS

CN    1921629 A    2/2007
CN    101644996 A    2/2010
(Continued)

OTHER PUBLICATIONS

López-Fuentes, F. A. "P2p video streaming strategies based on scalable video coding." Journal of applied research and technology 13, No. 1 (2015): 113-124. (Year: 2015).*
(Continued)

*Primary Examiner* — Younes Naji
*Assistant Examiner* — Melaku Y Habtemariam
(74) *Attorney, Agent, or Firm* — Morgan, Lewis & Bockius LLP (57) ABSTRACT

Embodiments of the present invention disclose a bit rate reduction processing method for a data file performed at a server, to reduce a download delay of a user. The server receives an upload application request sent by a first client; the server queries for an instant-transmission index according to the upload application request, the instant-transmission index being used to record association information of fileids of a plurality of original data files and fileids of corresponding bit rate reduction data files; the server sends a first instant-transmission hit instruction to a first client if the instant-transmission index is hit, the first instant-transmission hit instruction including a second fileid; the server receives a first download application request sent by a second client; and the server obtains a first bit rate reduction data file according to the second fileid, and sends the first bit rate reduction data file to the second client.

14 Claims, 4 Drawing Sheets

(51) Int. Cl.
*H04L 67/06* (2022.01)
*H04L 51/52* (2022.01)
*H04L 67/01* (2022.01)

(58) Field of Classification Search
USPC .................................................. 709/217, 219
See application file for complete search history.

(56) References Cited

U.S. PATENT DOCUMENTS

| | | | |
|---|---|---|---|
| 2007/0205888 A1* | 9/2007 | Lee ................ | H04L 12/66 340/539.18 |
| 2010/0245583 A1* | 9/2010 | Harel .............. | G08B 13/19695 348/159 |
| 2011/0007797 A1 | 1/2011 | Palmer et al. | |
| 2012/0102154 A1* | 4/2012 | Huang ............. | H04L 65/605 709/219 |
| 2012/0263241 A1 | 10/2012 | Swenson et al. | |
| 2012/0284241 A1* | 11/2012 | Amit ............... | G06F 16/00 707/693 |
| 2012/0310890 A1* | 12/2012 | Dodd ............... | G06F 11/1451 707/646 |
| 2013/0031211 A1* | 1/2013 | Johnson ........... | H04L 67/101 709/218 |
| 2014/0115050 A1* | 4/2014 | Liu ................ | H04N 21/234309 709/203 |
| 2014/0244592 A1* | 8/2014 | Mande ............. | H03M 7/3059 707/661 |
| 2014/0330894 A1* | 11/2014 | Zhao ............... | H04L 67/142 709/203 |
| 2015/0227425 A1 | 8/2015 | Li et al. | |
| 2015/0227496 A1* | 8/2015 | Liu ................ | G06F 3/04842 715/205 |
| 2015/0295962 A1* | 10/2015 | Zheng ............. | H04L 67/10 709/204 |
| 2018/0096046 A1* | 4/2018 | Carroll ........... | G06F 21/10 |
| 2018/0113876 A1* | 4/2018 | Akelbein .......... | G06F 16/1744 |

FOREIGN PATENT DOCUMENTS

| | | |
|---|---|---|
| CN | 101977218 A | 2/2011 |
| CN | 102780728 A | 11/2012 |
| CN | 103209355 A | 7/2013 |
| CN | 103379362 A | 10/2013 |
| CN | 104980479 A | 10/2015 |
| CN | 106210611 A | 12/2016 |
| WO | WO 2016055543 A1 | 4/2016 |

OTHER PUBLICATIONS

Kadhim, Alaa, Ghassan H. Abdul, and Rasha Subhi Ali. "Dynamic Clustering for Information Retrieval from Big Data Depending on Compressed Files." scanning 7, No. 1 (2016). (Year: 2016).*
Tencent Technology, ISR, PCT/CN2017/115179, dated Feb. 26, 2018, 2 pgs.
Tencent Technology, WO, PCT/CN2017/115179, dated Feb. 26, 2018, 3 pgs.
Tencent Technology, IPRP, PCT/CN2017/115179, dated Oct. 22, 2019, 4 pgs.

* cited by examiner

BIT RATE REDUCTION PROCESSING METHOD FOR DATA FILE, AND SERVER

CROSS-REFERENCE TO RELATED APPLICATIONS

This application is a continuation application of PCT/CN2017/115179, entitled "BIT RATE REDUCTION PROCESSING METHOD FOR DATA FILE, AND SERVER" filed on Dec. 8, 2017, which claims priority to Chinese Patent Application No. 201710262437.6, entitled "BIT RATE REDUCTION PROCESSING METHOD FOR DATA FILE, AND SERVER" filed with the Chinese Patent Office on Apr. 20, 2017, all of which are incorporated by reference in their entirety.

FIELD OF THE TECHNOLOGY

The present disclosure relates to the field of computer technologies, and in particular, to a bit rate reduction processing method for a data file, and a server.

BACKGROUND OF THE DISCLOSURE

With rapid development of network and multimedia technologies, requirements of users for viewing video content with the help of networks are increasing. In the existing technology, a user may transmit a video file when having a chat with another user by using a social networking tool (e.g., instant messenger application). To reduce traffic jam caused by downloading the video file, a social networking server usually needs to reduce a bit rate for the video file uploaded by the user.

In the existing technology, a bit rate reduction method designed by the social networking server for a video file may include the following steps: A user A uploads an original video file to the social networking server. The social networking server transcodes the original video file, and stores a newly generated bit rate reduction video file. In addition, the server records an association index for a file identifier (fileid) of the original video file and a fileid of a bit rate reduction video file. The social networking server notifies the user A of successful upload and feeds back the fileid of the original video file. The user A shares the fileid of the original video file in chat content, to instruct the user B to download. The user B requests the social networking server to download the video file uploaded by the user A. The social networking server queries, according to the fileid shared by the user A with the user B, whether the association index is hit; and if yes, downloads the bit rate reduction video file and returns the bit rate reduction video file to the user B; otherwise, downloads the original video file and returns the original video file to the user B.

In the existing technology, in a conventional solution, an association index is queried for each time a user requests download, increasing a download delay of the user. In addition, in a scenario of a group chat, usually, a quantity of times that a video file is downloaded is dozens of times that of an uploaded file. The social networking server needs to query for an association index once for a download request of each user. Consequently, there is a problem of amplification of a read request for querying for an association index in a download phase, that is, a fileid shared by the same user needs to be repeatedly queried for a plurality of times, increasing load of the social networking server.

SUMMARY

Embodiments of the present invention provide a bit rate reduction processing method for a data file, and a server, to lower a download delay of a user, and reduce load increased due to a plurality of queries performed by a server.

A first aspect of the present disclosure provides a bit rate reduction processing method for a data file performed at a server having one or more processors and memory storing a plurality of programs to be executed by the one or more processors, including:

receiving, by the server, an upload application request sent by a first client, the upload application request being used to request to upload a first original data file to the server;

querying, by the server, for an instant-transmission index according to the upload application request, the instant-transmission index being used to record association information of file identifiers (fileids) of a plurality of original data files and fileids of corresponding bit rate reduction data files;

sending, by the server, a first instant-transmission hit instruction to the first client if the instant-transmission index records association information of a first fileid of the first original data file and a second fileid of a corresponding first bit rate reduction data file, the first instant-transmission hit instruction including the second fileid, wherein the first client sends the second fileid to a second client;

receiving, by the server, a first download application request sent by the second client, the first download application request including the second fileid obtained by the second client from the first client; and obtaining, by the server, the first bit rate reduction data file from a storage warehouse according to the second fileid, and sending the first bit rate reduction data file to the second client.

A second aspect of the present disclosure further provides a server having one or more processors, memory coupled to the one or more processors and a plurality of programs stored in the memory. The plurality of programs, when executed by the one or more processors, cause the server to perform the aforementioned bit rate reduction processing method for a data file.

A third aspect of the present disclosure further provides a non-transitory computer-readable storage medium, storing a plurality of machine readable instructions in connection with a server having one or more processors. The plurality of machine readable instructions, when executed by the one or more processors, cause the server to perform the aforementioned bit rate reduction processing method for a data file..

It can be learned from the foregoing technical solutions that, the embodiments of the present invention have the following advantages:

In the embodiments of the present invention, a server receives an upload application request sent by a first client, the upload application request being used to request to upload a first original data file to the server; the server queries for an instant-transmission index according to the upload application request, the instant-transmission index being used to record association information of fileids of a plurality of original data files and fileids of corresponding bit rate reduction data files; the server sends a first instant-transmission hit instruction to the first client if the instant-transmission index records association information of a first fileid of the first original data file and a second fileid of a corresponding first bit rate reduction data file, the first instant-transmission hit instruction including the second fileid, and the first client sending the second fileid to a second client; the server receives a first download application request sent by the second client, the first download application request including the second fileid obtained by the second client; and the server obtains the first bit rate reduction data file according to the second fileid, and sends the first bit rate reduction data file to the second client. In the embodiments of the present invention, when the instant-transmission index found by the server according to the upload application request records the association information of the first fileid of the first original data file and the second fileid of the corresponding first bit rate reduction data file, the server returns the second fileid of the first bit rate reduction data file rather than the first fileid of the first original data file, so that when the second client requests download, the foregoing association information does not need to be queried for. Therefore, each time a user requests download, a step of querying for association information is omitted, thereby lowering a download delay of the user. In addition, in the embodiments of the present invention, the instant-transmission index records the association information of the fileids of the plurality of original data files and the fileids of the corresponding bit rate reduction data files, and if the instant-transmission index is hit according to the upload application request, the first client does not need to upload the first original data file to the server, thereby lowering an upload delay of the first client, and reducing upload traffic. In addition, in the embodiments of the present invention, because the step of querying for the association information for the second client can be omitted, when a plurality of second clients initiates a download application request to the server provided in the embodiments of the present invention, a step of querying for association information a plurality of times can also be omitted, thereby reducing load increased due to a plurality of queries performed by the server.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following descriptions show merely some embodiments of the present invention, and persons skilled in the art may still derive other drawings from these accompanying drawings.

FIG. 4-*a* is a schematic diagram of a composition structure of a server according to an embodiment of the present invention.

FIG. 4-*b* is a schematic diagram of a composition structure of another server according to an embodiment of the present invention.

FIG. 4-*c* is a schematic diagram of a composition structure of another server according to an embodiment of the present invention.

FIG. 4-*d* is a schematic diagram of a composition structure of another server according to an embodiment of the present invention.

DESCRIPTION OF EMBODIMENTS

Embodiments of the present invention provide a bit rate reduction processing method for a data file, and a server, to lower a download delay of a user, and reduce load increased due to a plurality of queries performed by a server.

To make the invention objectives, features, and advantages of the present disclosure clearer and more comprehensible, the following clearly and completely describes the technical solutions in the embodiments of the present invention with reference to the accompanying drawings in the embodiments of the present invention. Apparently, the embodiments described in the following are merely some rather than all of the embodiments of the present invention. All other embodiments obtained by persons skilled in the art based on the embodiments of the present invention shall fall within the protection scope of the present disclosure.

In the specification, claims, and the foregoing drawings of the present disclosure, the terms "include", "contain" and any other variants mean to cover a non-exclusive inclusion, so that a process, a method, a system, a product, or a device that includes a series of units is not necessarily limited to those units, but may include other units not expressly listed or inherent to such a process, method, product, or device.

Detailed descriptions are separately provided below.

Figure 1:
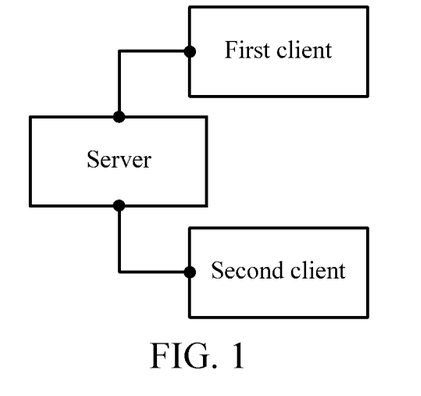
FIG. 1 is a schematic structural diagram of connections between a server and a plurality of clients according to an embodiment of the present invention.
Figure 2:
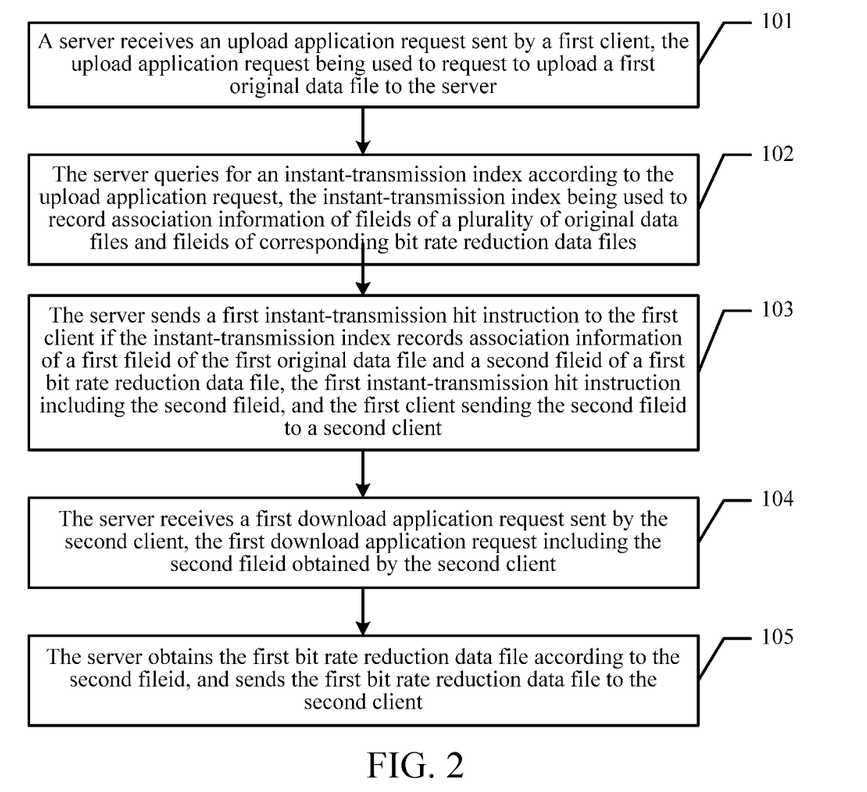
FIG. 2 is a schematic block flowchart of a bit rate reduction processing method for a data file according to an embodiment of the present invention.

An embodiment of a bit rate reduction processing method for a data file in the present disclosure may be specifically applied to a bit rate reduction processing scenario when a data file is uploaded to a server. FIG. 1 is a schematic structural diagram of connections between a server and a plurality of clients (e.g., mobile terminals) in connection with a social networking platform (e.g., instant messenger) according to an embodiment of the present invention. In this embodiment of the present invention, the server is connected to a plurality of clients. In FIG. 1, an example in which the server is connected to two clients (a first client and a second client) is used as for exemplary description. The first client is a client of a first user requesting to upload a data file to the server, and the second client is a client of a second user requesting to download the data file from the server. The server may be connected to a plurality of second clients. For example, in a scenario of a group chat, the server is specifically a social networking server, a social networking client uploads a video file, and a plurality of social networking clients downloads the video file. The first user at the first client shares a video content file with the second user via the social networking server, each user having a unique user account at the social networking server. As shown in FIG. 1, the method may include the following steps:

101: The server receives an upload application request sent by the first client, the upload application request being used to request to upload a first original data file to the server.

In this embodiment of the present invention, the first client is client requesting upload. To upload a data file, the first client needs to obtain, by using application signaling, information about the server and a file identifier of a storage location for upload of the data file. The first client sends the upload application request to the server. The server receives the upload application request sent by the first client. The server determines, according to the upload application request, that the first client needs to request to upload the first original data file. In this embodiment of the present invention, a data file may be a plurality of types of electronic files, such as video content, an image, and an application program package. In this embodiment of the present invention, to distinguish between different data files, the data file that the first client requests to upload is defined as the "first original data file".

In some embodiments of the present invention, before step 101 of receiving, by the server, an upload application request sent by the first client, the bit rate reduction processing method for a data file provided in this embodiment of the present invention may further include the following steps:

A1: The server obtains a plurality of original data files from a data file library.

A2: The server re-encodes the plurality of original data files respectively, to obtain a plurality of bit rate reduction data files.

A3: The server stores the plurality of original data files and the plurality of bit rate reduction data files into a storage warehouse, and updates association information of fileids of the plurality of original data files and fileids of the corresponding bit rate reduction data files to an instant-transmission index.

In step A1 to step A3, a prestorage manner of the server for the storage warehouse is described. The data file library is from the Internet, or may be a dedicated database in an enterprise. The server first obtains the plurality of original data files from the data file library, and re-encodes the original data files one by one; and then stores the plurality of original data files and the plurality of bit rate reduction data files into the storage warehouse, and updates the association information of the fileids of the plurality of original data files and the fileids of the corresponding bit rate reduction data files to the instant-transmission index, to increase association information recorded in the instant-transmission index. The server may obtain an original data file in a plurality of manners. For example, in some embodiments of the present invention, step A1 of obtaining, by the server, a plurality of original data files from a data file library includes the following steps:

A11: The server obtains, from the data file library, a plurality of original data files with a quantity of download times being greater than a download threshold.

The server may set the download threshold, and sorts all original data files in the data file library based on quantities of download times. For an original data file with a quantity of download times being greater than the download threshold, the server obtains the original data file, and then re-encodes the original data file, and stores the original data file into the storage warehouse. An example is used for description. If a data file is a video file, an original video file with a quantity of download times being greater than the download threshold may be a hot video file, and the server may re-encode the hot video file.

102: The server queries for an instant-transmission index according to the upload application request, the instant-transmission index being used to record association information of fileids of a plurality of original data files and fileids of corresponding bit rate reduction data files.

In this embodiment of the present invention, after the server receives the upload application request sent by the first client, the server queries for the instant-transmission index according to the upload application request. The instant-transmission index is used to record the association information of the fileids of the plurality of original data files and the fileids of the corresponding bit rate reduction data file. The bit rate reduction data file is a data file generated after the original data file is re-encoded. The bit rate reduction data file is re-encoded compared with the original data file, so that a file size can be reduced, and a file type of the original data file can also be changed. A specific re-encoding manner depends on an application scenario. In addition, in this embodiment of the present invention, there is an association relationship between the original data file and the corresponding bit rate reduction data file. The association information of the fileid of the original data file and the fileid of the corresponding bit rate reduction data file is recorded in the instant-transmission index. The fileid of the data file is a unique identifier indicating a storage location of the data file. The instant-transmission index is an index created based on the original data file, and records index information of the fileid of the bit rate reduction data file associated with the original data file.

Based on the foregoing descriptions of step A1 to step A3, the plurality of original data files and the corresponding bit rate reduction data files are prestored in the storage warehouse, and the storage warehouse further stores the instant-transmission index.

In some embodiments of the present invention, in addition to the foregoing steps, the bit rate reduction processing method for a data file provided in this embodiment of the present invention may further include the following steps:

B1: The server obtains a second original data file from the data file library.

B2: The server queries the storage warehouse for the instant-transmission index according to the second original data file.

B3: The server discards the second original data file if the instant-transmission index records a fileid of the second original data file, and continues to obtain a third original data file from the data file library.

B4, The server re-encodes the second original data file into a second bit rate reduction data file if the instant-transmission index is not found according to the second original data file.

B5: The server stores the second original data file and the second bit rate reduction data file into the storage warehouse, and updates association information of the fileid of the second original data file and a fileid of the second bit rate reduction data file to the instant-transmission index.

In this embodiment of the present invention, the server can further resolve, according to the instant-transmission index, load of the server that is increased due to secondary bit rate reduction performed on the same original data file in the existing technology. An example is used for description. The server obtains the second original data file from the data file library. The server queries the storage warehouse for the instant-transmission index according to the second original data file. The server discards the second original data file if the instant-transmission index records the fileid of the second original data file, and continues to obtain the third original data file from the data file library. In this embodiment of the present invention, the server may first query for the instant-transmission index before storing the second original data file into the storage warehouse. When the instant-transmission index is hit, the server does not perform secondary bit rate reduction on the second original data file. An example is used for description. The server may analyze a hot video based on flow statistics of instant-transmission hits during upload application, and filters bit rate reduction video flows according to a video type, to resolve a problem of secondary bit rate reduction after a bit rate reduction video is identified as a hot video.

In this embodiment of the present invention, the storage warehouse prestores the plurality of original data files, and the instant-transmission index is used to record the association information of the fileids of the plurality of original data files and the fileids of the corresponding bit rate reduction data file. The server queries for the instant-transmission index according to the upload application request sent by the first client, to determine, according to a hit status of the instant-transmission index, whether the first original data file is already stored in the storage warehouse. If the first original data file is already stored in the storage warehouse and bit rate reduction processing is completed on the first original data file, subsequent step 103 to step 105 continue to be performed.

In some embodiments of the present invention, after step 102 of the querying, by the server, a storage warehouse for an instant-transmission index according to the upload application request, in addition to the subsequent step 103 to step 105, the bit rate reduction processing method for a data file provided in this embodiment of the present invention may further include the following steps:

C1: The server sends a second instant-transmission hit instruction to the first client if the instant-transmission index records the first fileid of the first original data file and a first bit rate reduction data file corresponding to the first original data file does not exist in the storage warehouse, where the second instant-transmission hit instruction includes the first fileid, and the first client sends the first fileid to the second client.

C2: The server receives a second download application request sent by the second client, where the second download application request includes the first fileid obtained by the second client.

C3: The server obtains the first original data file from the storage warehouse according to the first fileid, and sends the first original data file to the second client.

In the scenario shown by step C1 to step C3, if the instant-transmission index records the first fileid of the first original data file and the first bit rate reduction data file corresponding to the first original data file does not exist in the storage warehouse, the server directly returns the second instant-transmission hit instruction to the first client. When receiving the second instant-transmission hit instruction, the first client can determine successful "instant-transmission", and the first client does not need to upload the first original data file to the server, thereby lowering an upload delay of the first client and reducing upload traffic. When the first bit rate reduction data file corresponding to the first original data file does not exist in the storage warehouse, it indicates that the server does not completely re-encode the first original data file. In this case, the server sends the second instant-transmission hit instruction to the first client. The second instant-transmission hit instruction includes the first fileid. The first client sends the first fileid to the second client. The server receives the second download application request sent by the second client. The second download application request includes the first fileid obtained by the second client. The server obtains the first original data file from the storage warehouse according to the first fileid, and sends the first original data file to the second client. In this embodiment of the present invention, the server obtains the first original data file from the storage warehouse by using the first fileid, and the server does not need to perform the step of querying for the association information in a download phase when downloading the data file for the second client, so that when the second client requests download, the foregoing association information does not need to be queried for. Therefore, each time a user requests download, a step of querying for association information is omitted, thereby lowering a download delay of the user.

In some embodiments of the present invention, after step 102 of the querying, by the server, a storage warehouse for an instant-transmission index according to the upload application request, in addition to the subsequent step C1 to step C3, the bit rate reduction processing method for a data file provided in this embodiment of the present invention may further include the following steps:

D1: The server allocates a third fileid to the first original data file if the instant-transmission index is not found according to the upload application request, and returns the third fileid to the first client.

D2: The server receives the first original data file that is sent by the first client according to the third fileid, and re-encodes the first original data file into the first bit rate reduction data file.

D3: The server stores the first original data file and the first bit rate reduction data file into a storage warehouse, and updates association information of the third fileid of the first original data file and the second fileid of the first bit rate reduction data file to the instant-transmission index.

D4: The server sends an upload success instruction to the first client, where the upload success instruction includes the second fileid.

When the first original data file is not recorded in the storage warehouse, the instant-transmission index cannot be hit according to the upload application request. The server allocates the third fileid to the first original data file, and returns the third fileid to the first client. The first client sends the first original data file to the server according to the third fileid. After receiving the first original data file, the server re-encodes the first original data file into the first bit rate reduction data file, and the server stores the first original data file and the first bit rate reduction data file into the storage warehouse, and updates the association information of the third fileid of the first original data file and the second fileid of the first bit rate reduction data file to the instant-transmission index, so that when a client applies for upload of the first original data file subsequently, the instant-transmission index can be hit. The server sends the upload success instruction to the first client, where the upload success instruction includes the second fileid. The first client may then share the second fileid with the second client, so that the second client may send the second download application request to the second server. For details about a processing manner of the server, refer to descriptions of subsequent step 104 to step 105.

In some embodiments of the present invention, step 102 of the querying, by the server, a storage warehouse for an instant-transmission index according to the upload application request includes the following steps:

E1: The server obtains a message digest algorithm 5 (MD5 ) value of the first original data file.

E2: The server queries the storage warehouse for the instant-transmission index according to the MD5 value of the first original data file.

After receiving the upload application request sent by the first client, the server obtains the MD5 value of the first original data file from the upload application request. The server queries the storage warehouse for the instant-transmission index according to the MD5 value of the first original data file, to determine, through MD5 calculation and matching, whether the first original video file hits the instant-transmission index. An example is used for description. The server queries, according to the MD5 value of the original video file, whether there is a record of the original video file in the instant-transmission index, to determine whether to perform step 103 in subsequent steps.

103: The server sends a first instant-transmission hit instruction to the first client if the instant-transmission index records association information of a first fileid of the first original data file and a second fileid of a first bit rate reduction data file, the first instant-transmission hit instruction including the second fileid, and the first client sending the second fileid to the second client.

In this embodiment of the present invention, if the instant-transmission index records the association information of the first fileid of the first original data file and the second fileid of the first bit rate reduction data file, it indicates that the server already prestores the first original data file in the storage warehouse and completes bit rate reduction processing on the first original data file. A data file obtained after the first original data file is re-encoded is defined as the first bit rate reduction data file. If a file identifier corresponding to a storage location of the first original data file in the storage warehouse is the first fileid, and a file identifier corresponding to a storage location of the first bit rate reduction data file in the storage warehouse is the second fileid, the association information of the first fileid and the second fileid is recorded in the instant-transmission index. If a query index is hit according to the upload application request of the first client, the server sends the first instant-transmission hit instruction to the first client. The first instant-transmission hit instruction includes the second fileid, and the first client sends the second fileid to the second client. Because the first instant-transmission hit instruction sent by the server includes the second fileid of the first bit rate reduction data file, the first client may send the second fileid to the second client, so that the second client can complete download of the data file according to the second fileid.

In this embodiment of the present invention, if the instant-transmission index records the association information of the first fileid of the first original data file and the second fileid of the first bit rate reduction data file, the server directly returns the first instant-transmission hit instruction to the first client. When receiving the first instant-transmission hit instruction, the first client can determine successful "instant-transmission", and the first client does not need to upload the first original data file to the server, thereby lowering an upload delay of the first client and reducing upload traffic.

104: The server receives a first download application request sent by the second client, the first download application request including the second fileid obtained by the second client.

In this embodiment of the present invention, after the second client obtains, through the first client, the second fileid shared by the first client, the second client sends the first download application request to the server. The first download application request carries the second fileid obtained by the second client. The server determines, according to the first download application request, the fileid of the data file that needs to be downloaded by the second client.

105: The server obtains the first bit rate reduction data file according to the second fileid, and sends the first bit rate reduction data file to the second client.

In this embodiment of the present invention, after the server obtains the second fileid from the first download application request, the server obtains the first bit rate reduction data file from the storage warehouse according to the second fileid, and sends the first bit rate reduction data file to the second client. The second client receives the first bit rate reduction data file from the server. In this embodiment of the present invention, the server obtains the first bit rate reduction data file from the storage warehouse by using the second fileid, and the server does not need to perform the step of querying for the association information in the download phase when downloading the data file for the second client, so that when the second client requests download, the foregoing association information does not need to be queried for. Therefore, each time a user requests download, a step of querying for association information is omitted, thereby lowering a download delay of the user. In addition, in this embodiment of the present invention, because the step of querying for the association information for the second client can be omitted, when a plurality of second clients initiates a download application request to the server provided in this embodiment of the present invention, a step of querying for association information a plurality of times can also be omitted, thereby reducing load increased due to a plurality of queries performed by the server.

It can be learned from the descriptions of this embodiment of the present invention in the foregoing embodiment that, a server receives an upload application request sent by a first client, the upload application request being used to request to upload a first original data file to the server; the server queries for an instant-transmission index according to the upload application request, the instant-transmission index being used to record association information of fileids of a plurality of original data files and fileids of corresponding bit rate reduction data files; the server sends a first instant-transmission hit instruction to the first client if the instant-transmission index records association information of a first fileid of the first original data file and a second fileid of a first bit rate reduction data file, the first instant-transmission hit instruction including the second fileid, and the first client sending the second fileid to a second client; the server receives a first download application request sent by the second client, the first download application request including the second fileid obtained by the second client; and the server obtains the first bit rate reduction data file according to the second fileid, and sends the first bit rate reduction data file to the second client. In this embodiment of the present invention, when the instant-transmission index found by the server according to the upload application request records the association information of the first fileid of the first original data file and the second fileid of the first bit rate reduction data file, the server returns the second fileid of the first bit rate reduction data file rather than the first fileid of the first original data file, so that when the second client requests download, the foregoing association information does not need to be queried for. Therefore, each time a user requests download, a step of querying for association information is omitted, thereby lowering a download delay of the user. In addition, in this embodiment of the present invention, the instant-transmission index records the association information of the fileids of the plurality of original data files and the fileids of the corresponding bit rate reduction data files, and if the instant-transmission index is hit according to the upload application request, the first client does not need to upload the first original data file to the server, thereby lowering an upload delay of the first client, and reducing upload traffic. In addition, in this embodiment of the present invention, because the step of querying for the association information for the second client can be omitted, when a plurality of second clients initiates a download application request to the server provided in this embodiment of the present invention, a step of querying for association information a plurality of times can also be omitted, thereby reducing load increased due to a plurality of queries performed by the server.

For better understanding and implementation of the foregoing solutions of the embodiments of the present invention, specific descriptions are provided below by using examples of corresponding application scenarios.

In this embodiment of the present invention, an example in which a data file is specifically a video file is used for description. In this embodiment of the present invention, the video file may be uploaded and downloaded based on application signaling. An instant-transmission index based on the video file is created at the background. Association information of a hot video and a bit rate reduction video is recorded in the instant-transmission index. A user A sends an upload application request. The server queries for the instant-transmission index, and returns, based on a query result, whether an original video file exists and fileid information of the video file. If the original video file exists and is associated with a bit rate reduction video, the user A directly instructs a user B to perform download by using a fileid of the bit rate reduction video. The user B may download the bit rate reduction video from the server. In this embodiment of the present invention, the storage warehouse is used on the side of the server. An association relationship between a hot video file and a bit rate reduction video may be recorded in advance in the instant-transmission index. After instant-transmission is hit in an upload application phase, a client 1 does not need to continue upload of the original video file, and the client 1 shares, with a client 2, the fileid of the bit rate reduction video returned by the server, to instruct the client 2 to directly download the bit rate reduction video.

Figure 3:
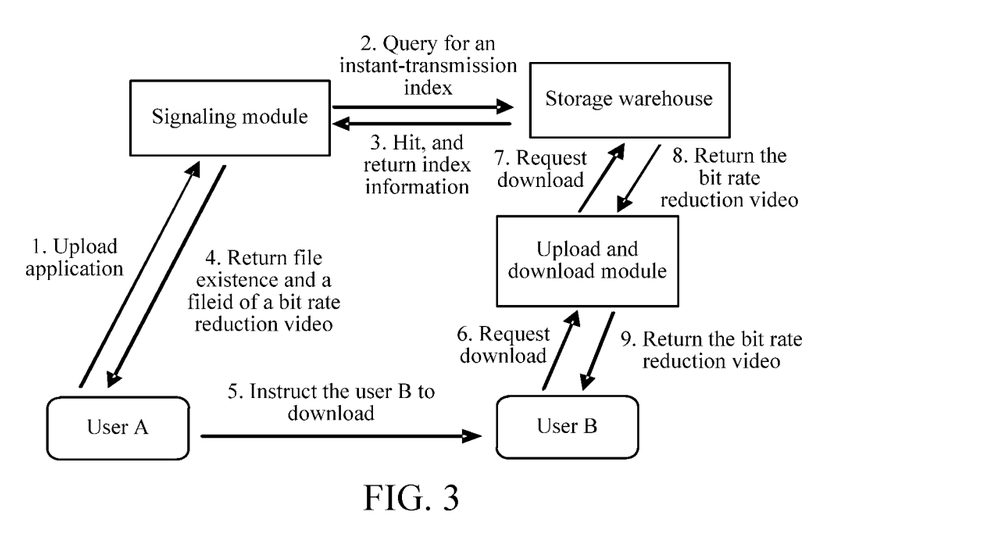
FIG. 3 is a schematic diagram of uploading and downloading a video file by a server according to an embodiment of the present invention.

FIG. 3 is a schematic diagram of uploading and downloading a video file by a server according to an embodiment of the present invention. In this embodiment of the present invention, the video file is uploaded and downloaded mainly by querying for an instant-transmission index based on application signaling. A specific method is as follows:

Step 1: A user A sends an upload application request to a signaling module in the server by using a client 1.

Step 2: The signaling module in the server queries a storage warehouse for an instant-transmission index.

Step 3: The storage warehouse returns index information to the signaling module if the instant-transmission index is hit.

Step 4: The signaling module returns, to the user A, existence of an original video file and fileid information of a bit rate reduction video.

Step 5: The user A notifies a client 2 of a user B of the fileid information of the bit rate reduction video by using the client 1.

Step 6: The user B sends a download application request to the client 2 by using an upload and download module of the server.

Step 7: The upload and download module sends the download application request to the storage warehouse.

Step 8: The storage warehouse returns the bit rate reduction video to the upload and download module.

Step 9: The upload and download module returns the bit rate reduction video to the user B.

In the foregoing implementation scenario, after receiving the upload application request, the signaling module accesses the storage warehouse to query for the instant-transmission index, and after instant-transmission is hit, returns, based on whether there is associated bit rate reduction information in the index information, a fileid of the original video file or a fileid of the bit rate reduction video. The upload user A instructs the download user B to download the video corresponding to the fileid. After receiving the download request of the user B, the upload and download module obtains the video file from the storage warehouse. The storage warehouse returns data, and then transparently transmits data to the user B.

In the foregoing implementation scenario, after identifying a video as a hot video, the server transcodes an original video file, stores a newly generated bit rate reduction video, records, in an instant-transmission index, association information of a fileid of the original video and a fileid of the bit rate reduction video, creates an instant-transmission index of the bit rate reduction video, and records association information of the fileid of the bit rate reduction video and the fileid of the original video. After receiving an upload application signaling request of the user A, the server queries whether the video file hits the instant-transmission index. If the instant-transmission index is hit and an association index exists, existence of the original video file and fileid information of the bit rate reduction video are returned to the user A. If the instant-transmission index is hit and an association index does not exist, existence of the original video file and fileid information of the original video are returned to the user A. If the instant-transmission index is not hit, non-existence of the original video file is returned, and a new fileid is allocated to the user A. If the original video file already exists, instant-transmission for the user A is hit, and the user B is directly instructed to download a file by using the fileid that is returned by using the application signaling; otherwise, the user A first uploads a file by using the fileid, and then instructs the user B to download the file by using the fileid. Finally, the user B requests the server to download video file, and the server returns the file corresponding to the fileid.

It can be learned from the foregoing descriptions of the examples that, in this embodiment of the present invention, the server uses the instant-transmission index, and when a user forwards or sends an uploaded video, a hit of instant-transmission is queried for in an upload application phase, and a video file is not uploaded to the background, thereby lowering an upload delay and reducing upload traffic. Association information of an original video file and a bit rate reduction video is created based on the instant-transmission index. A fileid of an actually downloaded video is returned in the upload application phase. In the existing technology, during download, an association index needs to be queried for. Compared with the existing technology, in this embodiment of the present invention, a quantity of times that the server performs a query in a download phase is reduced by one, thereby reducing a download delay. In a scenario of a group chat, a quantity of download times is dozens of times a quantity of upload times. The instant-transmission index is queried for in the upload application phase, thereby resolving a problem of amplification of a read request for a query index in the download phase. After a hot file is uploaded, the hot file is correspondingly downloaded hundreds of times. In the existing technology, each user needs to query for an index in the download phase, so that hundreds of queries are performed. In this embodiment of the present invention, the server can download the video file for the user without querying for an association index. In this embodiment of the present invention, in the upload application phase, a video type, namely, a bit rate reduction video, a bit rate reduction original video, or a normal video without bit rate reduction can be determined by using the instant-transmission index, to flexibly configure a download policy and be compatible with download for an old client. From a perspective of hot video identification, a hot video may be analyzed based on flow statistics of instant-transmission hits during upload application, and bit rate reduction video flows are filtered according to a video type, to resolve a problem of secondary bit rate reduction after a bit rate reduction video is identified as a hot video. Herein, the flow refers to a flow for a hit of instant-transmission during upload application, a flow for a hit of instant-transmission of a bit rate reduction video is filtered to prevent secondary bit rate reduction caused because bit rate reduction processing is performed again after the bit rate reduction video is identified as a hot video again.

It should be noted that, for ease of description, the foregoing method embodiments are expressed as a series of actions. However, persons skilled in the art should appreciate that the present disclosure is not limited to the described action sequence, because according to the present disclosure, some steps may be performed in other sequences or performed simultaneously. In addition, persons skilled in the art should also understand that the embodiments described in this specification all belong to exemplary embodiments, and the involved actions and modules are not necessarily mandatory to the present disclosure.

To better implement the foregoing solutions of the embodiments of the present invention, related apparatuses configured to implement the foregoing solutions are further provided below.

Referring to FIG. 4-a, a server 400 provided in an embodiment of the present invention may include a receiving module 401, an instant-transmission index query module 402, a sending module 403, and a file download module 404.

Figure 4A:
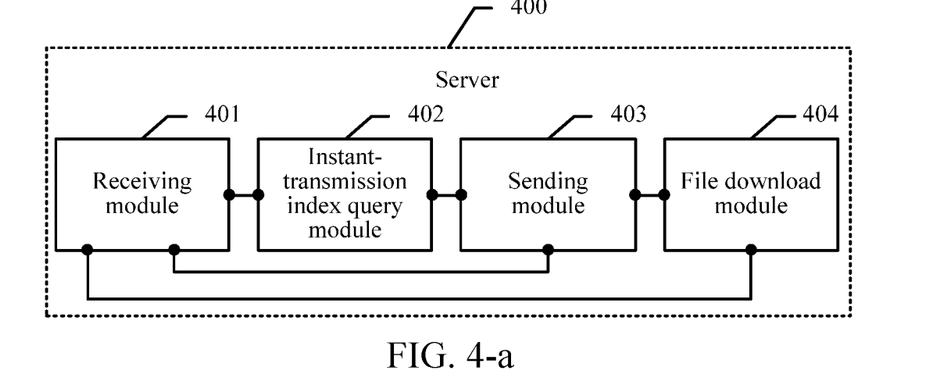

The receiving module 401 is configured to receive an upload application request sent by a first client, the upload application request being used to request to upload a first original data file to the server.

The instant-transmission index query module 402 is configured to query for an instant-transmission index according to the upload application request, the instant-transmission index being used to record association information of file identifiers fileids of a plurality of original data files and fileids of corresponding bit rate reduction data files.

The sending module 403 is configured to send a first instant-transmission hit instruction to the first client if the instant-transmission index records association information of a first fileid of the first original data file and a second fileid of a first bit rate reduction data file, the first instant-transmission hit instruction including the second fileid, and the first client sending the second fileid to a second client.

The receiving module 401 is further configured to receive a first download application request sent by the second client, the first download application request including the second fileid obtained by the second client.

The file download module 404 is configured to: obtain the first bit rate reduction data file from the storage warehouse according to the second fileid, and send the first bit rate reduction data file to the second client.

In some embodiments of the present invention, referring to FIG. 4-b, compared with what is shown in FIG. 4-b, the server 400 further includes a first obtaining module 405, a first bit rate reduction module 406, and a first storage module 407.

Figure 4B:
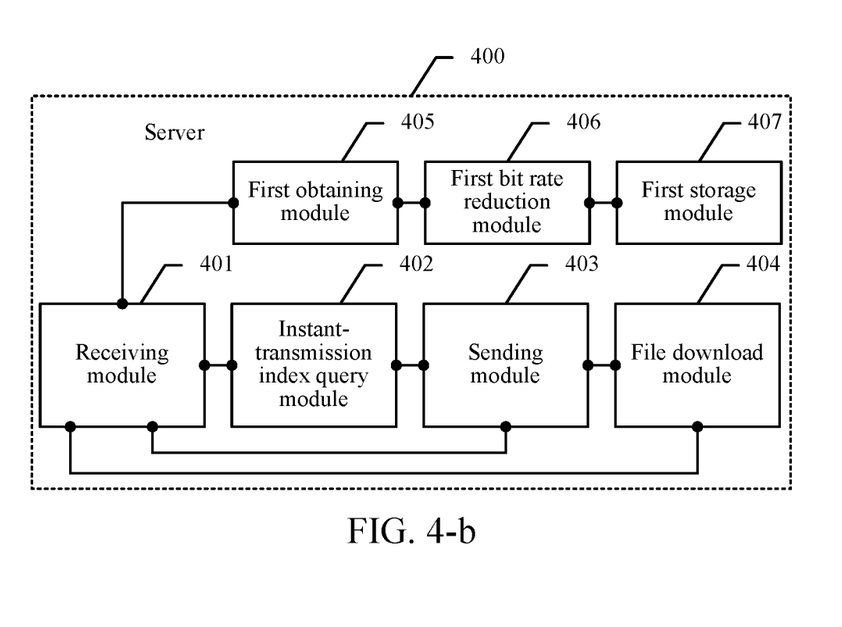

The first obtaining module 405 is configured to: before the receiving module 401 receives the upload application request sent by the first client, obtain the plurality of original data files from a data file library.

The first bit rate reduction module 406 is configured to re-encode the plurality of original data files respectively, to obtain a plurality of bit rate reduction data files.

The first storage module 407 is configured to: store the plurality of original data files and the plurality of bit rate reduction data files into a storage warehouse, and update association information of fileids of the plurality of original data files and fileids of the corresponding bit rate reduction data files to an instant-transmission index.

In some embodiments of the present invention the sending module 403 is further configured to: after the instant-transmission index query module queries for the instant-transmission index according to the upload application request, send a second instant-transmission hit instruction to the first client if the instant-transmission index records the first fileid of the first original data file and a first bit rate reduction data file corresponding to the first original data file does not exist in the storage warehouse, where the second instant-transmission hit instruction includes the first fileid, and the first client sends the first fileid to the second client.

The receiving module 401 is further configured to receive a second download application request sent by the second client, where the second download application request includes the first fileid obtained by the second client.

The file download module 404 is further configured to: obtain the first original data file from the storage warehouse according to the first fileid, and send the first original data file to the second client.

In some embodiments of the present invention, referring to FIG. 4-c, the server 400 further includes an identifier allocation module 408, a second bit rate reduction module 409, and a second storage module 410.

Figure 4C:
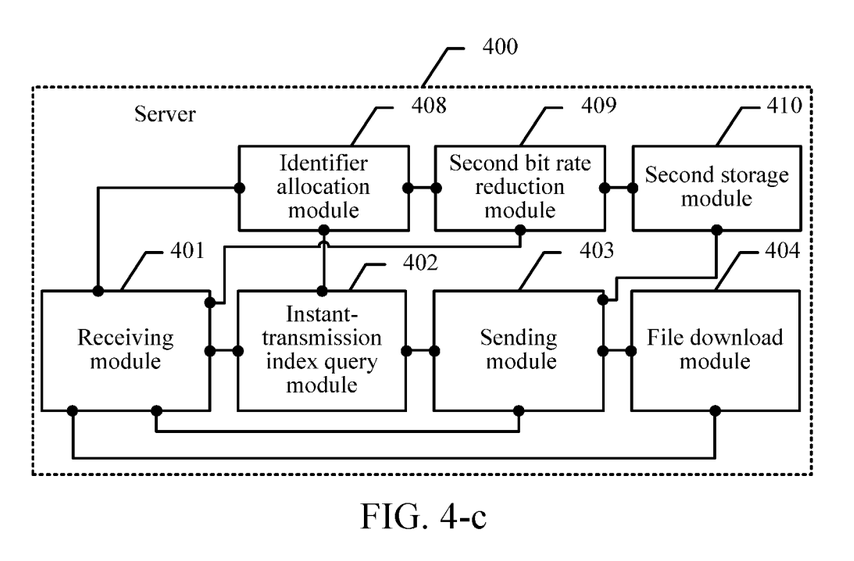

The identifier allocation module 408 is configured to: after the instant-transmission index query module 402 queries the storage warehouse for the instant-transmission index according to the upload application request, allocate a third fileid to the first original data file if the instant-transmission index is not found according to the upload application request, and return the third fileid to the first client.

The receiving module 401 is further configured to receive the first original data file that is sent by the first client according to the third fileid.

The second bit rate reduction module 409 is configured to re-encode the first original data file into a first bit rate reduction data file.

The second storage module 410 is configured to: store the first original data file and the first bit rate reduction data file into a storage warehouse, and update association information of the third fileid of the first original data file and the second fileid of the first bit rate reduction data file to the instant-transmission index.

The sending module 403 is further configured to send an upload success instruction to the first client, where the upload success instruction includes the second fileid.

In some embodiments of the present invention, referring to FIG. 4-d, compared with what is shown in FIG. 4-a, the server 400 further includes a second obtaining module 411, a third bit rate reduction module 412, and a third storage module 413.

Figure 4D:
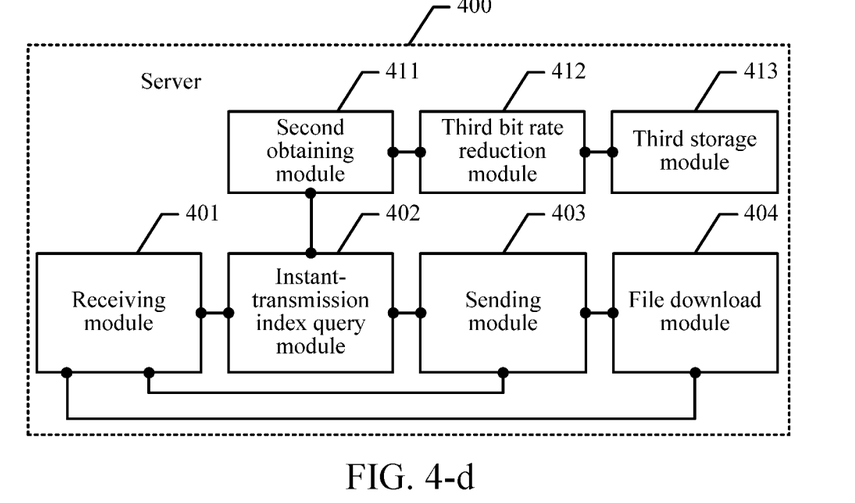

The second obtaining module 411 is configured to obtain a second original data file from the data file library.

The instant-transmission index query module 402 is further configured to query the storage warehouse for the instant-transmission index according to the second original data file.

The second obtaining module 411 is further configured to: discard the second original data file if the instant-transmission index records a fileid of the second original data file, and continue to obtain a third original data file of the data file library.

The third bit rate reduction module 412 is configured to re-encode the second original data file into a second bit rate reduction data file if the instant-transmission index is not found according to the second original data file.

The third storage module 413 is configured to: store the second original data file and the second bit rate reduction data file into the storage warehouse, and update association information of the fileid of the second original data file and a fileid of the second bit rate reduction data file to the instant-transmission index.

In some embodiments of the present invention, the instant-transmission index query module 402 is specifically configured to: obtain an MD5 value of the first original data file; and query the storage warehouse for the instant-transmission index according to the MD5 value of the first original data file.

It can be learned from the foregoing descriptions of this embodiment of the present invention that, a server receives an upload application request sent by a first client, the upload application request being used to request to upload a first original data file to the server; the server queries a storage warehouse for an instant-transmission index according to the upload application request, the instant-transmission index being used to record association information of fileids of a plurality of original data files and fileids of corresponding bit rate reduction data files that are prestored in the storage warehouse; the server sends a first instant-transmission hit instruction to the first client if the instant-transmission index records association information of a first fileid of the first original data file and a second fileid of a first bit rate reduction data file, the first instant-transmission hit instruction including the second fileid, and the first client sending the second fileid to a second client; the server receives a first download application request sent by the second client, the first download application request including the second fileid obtained by the second client; and the server obtains the first bit rate reduction data file from the storage warehouse according to the second fileid, and sends the first bit rate reduction data file to the second client. In this embodiment of the present invention, when the instant-transmission index found by the server according to the upload application request records the association information of the first fileid of the first original data file and the second fileid of the first bit rate reduction data file, the server returns the second fileid of the first bit rate reduction data file rather than the first fileid of the first original data file, so that when the second client requests download, the foregoing association information does not need to be queried for. Therefore, each time a user requests download, a step of querying for association information is omitted, thereby lowering a download delay of the user. In addition, in this embodiment of the present invention, the storage warehouse prestores the association information of the fileids of the plurality of original data files and the fileids of the corresponding bit rate reduction data files, and if the instant-transmission index is hit according to the upload application request, the first client does not need to upload the first original data file to the server, thereby lowering an upload delay of the first client, and reducing upload traffic. In addition, in this embodiment of the present invention, because the step of querying for the association information for the second client can be omitted, when a plurality of second clients initiates a download application request to the server provided in this embodiment of the present invention, a step of querying for association information a plurality of times can also be omitted, thereby reducing load increased due to a plurality of queries performed by the server.

Figure 5:
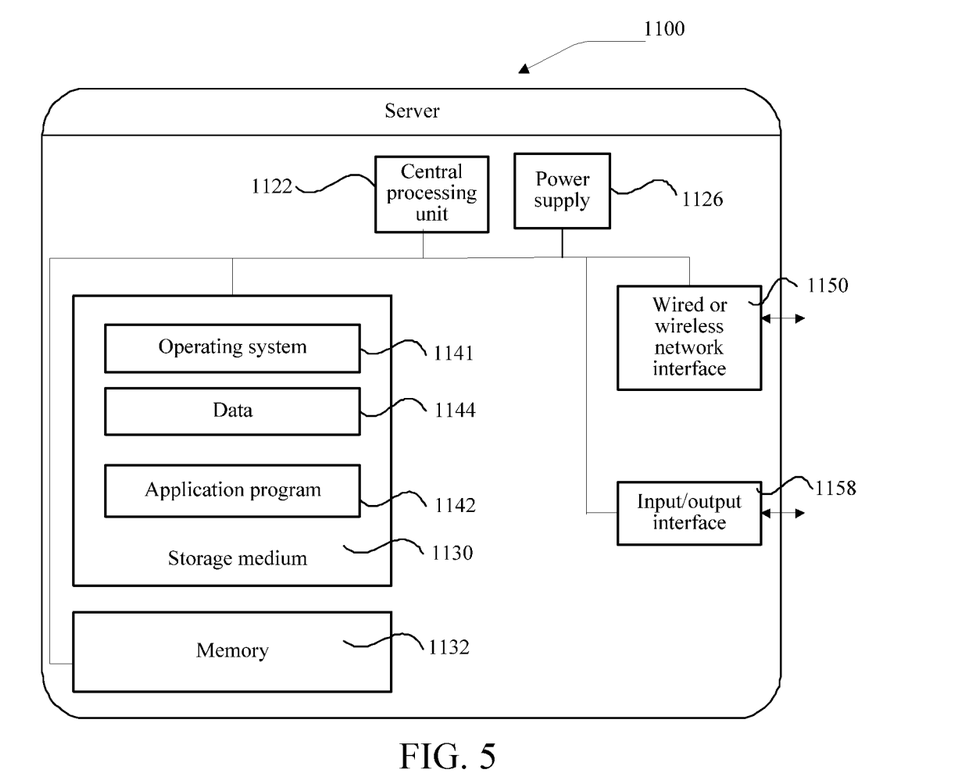
FIG. 5 is a schematic diagram of a composition structure of a server to which a bit rate reduction processing method for a data file is applied according to an embodiment of the present invention.

FIG. 5 is a schematic structural diagram of a server according to an embodiment of the present invention. The server 1100 may vary greatly due to different configurations or performance, and may include one or more central processing units (CPU) 1122 (for example, one or more processors), a memory 1132, and one or more storage media 1130 (for example, one or more mass storage devices) that store an application program 1142 or data 1144. The memory 1132 and the storage medium 1130 may be transient storages or persistent storages. The program stored in the storage medium 1130 may include one or more modules (not shown), and each module may include a series of instruction and operations for the server. Further, the CPU 1122 may be configured to: communicate with the storage medium 1130, and perform, on the server 1100, a series of instructions and operations in the storage medium 1130.

The server 1100 may further include one or more power supplies 1126, one or more wired or wireless network interfaces 1150, one or more input/output interfaces 1158, and/or one or more operating systems 1141, for example, Windows Server™, Mac OS X™, Unix™, Linux™, and FreeBSD™.

The steps of the bit rate reduction processing method for a data file performed by the server in the foregoing embodiments may be based on the server structure shown in FIG. 5.

It can be learned from the foregoing descriptions of the examples that, in the embodiments of the present invention, when the instant-transmission index found by the server according to the upload application request records the association information of the first fileid of the first original data file and the second fileid of the first bit rate reduction data file, the server returns the second fileid of the first bit rate reduction data file rather than the first fileid of the first original data file, so that when the second client requests download, the foregoing association information does not need to be queried for. Therefore, each time a user requests download, a step of querying for association information is omitted, thereby lowering a download delay of the user. In addition, in the embodiments of the present invention, the storage warehouse prestores the association information of the fileids of the plurality of original data files and the fileids of the corresponding bit rate reduction data files, and if the instant-transmission index is hit according to the upload application request, the first client does not need to upload the first original data file to the server, thereby lowering an upload delay of the first client, and reducing upload traffic. In addition, in this embodiment of the present invention, because the step of querying for the association information for the second client can be omitted, when a plurality of second clients initiates a download application request to the server provided in the embodiments of the present invention, a step of querying for association information a plurality of times can also be omitted, thereby reducing load increased due to a plurality of queries performed by the server.

In addition, it should be noted that the described apparatus embodiment is merely exemplary. The units described as separate parts may or may not be physically separate, and parts displayed as units may or may not be physical units, may be located in one position, or may be distributed on a plurality of network units. Some or all modules thereof may be selected based on an actual requirement, to implement an objective of the solutions in the embodiments. In addition, in the accompanying drawings of the apparatus embodiments provided in the present disclosure, connection relationships between modules indicate that the modules have communication connections with each other, which may be specifically implemented as one or more communications buses or signal cables. Persons of ordinary skill in the art may understand and implement the objective without creative efforts.

Based on the descriptions of the foregoing implementations, persons skilled in the art may clearly understand that the present disclosure may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve the same function may be of various forms, for example, in a form of an analog circuit, a digital circuit, or a dedicated circuit. However, as for the present disclosure, software program implementation is a better implementation in most cases. Based on such an understanding, the technical solutions of the present disclosure essentially or the part contributing to the existing technology may be implemented in a form of a software product. The computer software product is stored in a readable storage medium, such as a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, a network device, and the like) to perform the methods described in the embodiments of the present invention.

In conclusion, the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A bit rate reduction processing method for a data file performed at a server having one or more processors and memory storing a plurality of programs to be executed by the one or more processors, comprising:
   receiving, by the server, an upload application request sent by a first client, the upload application request being used to request to upload a first original data file to the server and generated in response to a request by a first user at the first client to share the first original data file with a second user at a second client, wherein the first user and the second user each have a user account at a social networking platform;
   querying, by the server, for an instant-transmission index according to the upload application request, the instant-transmission index being used to record association information of file identifiers (fileids) of a plurality of original data files, including a first original data file and a second original data file, and fileids of corresponding bit rate reduction data files, including querying a storage warehouse that stores the instant-transmission index whether the first original data file is already stored in the storage warehouse and has a corresponding first bit rate reduction data file having similar content as the first original data file but having a smaller file size than the first original data file, wherein the first original data file and the corresponding first bit rate reduction data file are recorded as being associated in the instant-transmission index;
   sending, by the server, a first instant-transmission hit instruction to the first client when the instant-transmission index records association information of a first fileid of the first original data file and a second fileid of the corresponding first bit rate reduction data file, the first instant-transmission hit instruction comprising the second fileid, wherein the first client sends the second fileid to the second client;
   receiving, by the server, a first download application request sent by the second client, the first download application request comprising the second fileid obtained by the second client from the first client;
   obtaining, by the server, the first bit rate reduction data file according to the second fileid, and sending the first bit rate reduction data file to the second client;
   before receiving, by the server, the upload application request sent by a first client:
      obtaining, by the server, the plurality of original data files from a data file library;
      re-encoding, by the server, the plurality of original data files respectively, to obtain a plurality of bit rate reduction data files;
      storing, by the server, the plurality of original data files and the plurality of bit rate reduction data files into a storage warehouse, and updating association information of the fileids of the plurality of original data files and the fileids of the corresponding bit rate reduction data files to the instant-transmission index;
   after querying, by the server, for an instant-transmission index according to the upload application request:
      sending, by the server, a second instant-transmission hit instruction to the first client if the instant-transmission index records the first fileid of the first original data file and a first bit rate reduction data file corresponding to the first original data file does not exist in the storage warehouse, wherein the second instant-transmission hit instruction comprises the first fileid, and the first client sends the first fileid to the second client;
      receiving, by the server, a second download application request sent by the second client, wherein the second download application request comprises the first fileid obtained by the second client; and
      obtaining, by the server, the first original data file from the storage warehouse according to the first fileid, and sending the first original data file to the second client.

2. The method according to claim 1, wherein the obtaining, by the server, the plurality of original data files from a data file library comprises:
   obtaining, by the server from the data file library, a plurality of original data files with a quantity of download times being greater than a download threshold.

3. The method according to claim 1, further comprising:
   obtaining, by the server, a second original data file from the data file library;
   querying, by the server, the storage warehouse for the instant-transmission index according to the second original data file;
   discarding, by the server, the second original data file if the instant-transmission index records a fileid of the second original data file, and continuing to obtain a third original data file from the data file library;

re-encoding, by the server, the second original data file into a second bit rate reduction data file if the instant-transmission index is not found according to the second original data file; and storing, by the server, the second original data file and the second bit rate reduction data file into the storage warehouse, and updating association information of the fileid of the second original data file and a fileid of the second bit rate reduction data file to the instant- transmission index.

4. The method according to claim 1, wherein the querying, by the server, for an instant-transmission index according to the upload application request comprises:

obtaining, by the server, a message digest algorithm 5 (MD5) value of the first original data file; and querying, by the server, the storage warehouse for the instant-transmission index according to the MD5 value of the first original data file.

5. The method according to claim 1, further comprising:

after querying, by the server, for an instant-transmission index according to the upload application request:

allocating, by the server, a third fileid to the first original data file if the instant-transmission index is not found according to the upload application request, and returning the third fileid to the first client;

receiving, by the server, the first original data file that is sent by the first client according to the third fileid, and re-encoding the first original data file into the first bit rate reduction data file;

storing, by the server, the first original data file and the first bit rate reduction data file into a storage warehouse, and updating association information of the third fileid of the first original data file and the second fileid of the first bit rate reduction data file to the instant-transmission index; and sending, by the server, an upload success instruction to the first client, wherein the upload success instruction comprises the second fileid.

6. A server comprising one or more processors, memory coupled to the one or more processors and a plurality of programs stored in the memory, wherein the plurality of programs, when executed by the one or more processors, cause the server to perform a plurality of operations comprising:

receiving, by the server, an upload application request sent by a first client, the upload application request being used to request to upload a first original data file to the server and generated in response to a request by a first user at the first client to share the first original data file with a second user at a second client, wherein the first user and the second user each have a user account at a social networking platform;

querying, by the server, for an instant-transmission index according to the upload application request, the instant-transmission index being used to record association information of file identifiers (fileids) of a plurality of original data files, including a first original data file and a second original data file, and fileids of corresponding bit rate reduction data files, including querying a storage warehouse that stores the instant- transmission index whether the first original data file is already stored in the storage warehouse and has a corresponding first bit rate reduction data file having similar content as the first original data file but having a smaller file size than the first original data file, wherein the first original data file and the corresponding first bit rate reduction data file are recorded as being associated in the instant-transmission index;

sending, by the server, a first instant-transmission hit instruction to the first client when the instant-transmission index records association information of a first fileid of the first original data file and a second fileid of the corresponding first bit rate reduction data file, the first instant-transmission hit instruction comprising the second fileid, wherein the first client sends the second fileid to the second client;

receiving, by the server, a first download application request sent by the second client, the first download application request comprising the second fileid obtained by the second client from the first client;

obtaining, by the server, the first bit rate reduction data file according to the second fileid, and sending the first bit rate reduction data file to the second client;

before receiving, by the server, the upload application request sent by a first client:

obtaining, by the server, the plurality of original data files from a data file library;

re-encoding, by the server, the plurality of original data files respectively, to obtain a plurality of bit rate reduction data files;

storing, by the server, the plurality of original data files and the plurality of bit rate reduction data files into a storage warehouse, and updating association information of the fileids of the plurality of original data files and the fileids of the corresponding bit rate reduction data files to the instant-transmission index;

after querying, by the server, for an instant-transmission index according to the upload application request:

sending, by the server, a second instant-transmission hit instruction to the first client if the instant-transmission index records the first fileid of the first original data file and a first bit rate reduction data file corresponding to the first original data file does not exist in the storage warehouse, wherein the second instant-transmission hit instruction comprises the first fileid, and the first client sends the first fileid to the second client;

receiving, by the server, a second download application request sent by the second client, wherein the second download application request comprises the first fileid obtained by the second client; and obtaining, by the server, the first original data file from the storage warehouse according to the first fileid, and sending the first original data file to the second client.

7. The server according to claim 6, wherein the obtaining, by the server, the plurality of original data files from a data file library comprises:

obtaining, by the server from the data file library, a plurality of original data files with a quantity of download times being greater than a download threshold.

8. The server according to claim 6, wherein the plurality of operations further comprise:

obtaining, by the server, a second original data file from the data file library;

querying, by the server, the storage warehouse for the instant-transmission index according to the second original data file;

discarding, by the server, the second original data file if the instant-transmission index records a fileid of the second original data file, and continuing to obtain a third original data file from the data file library;

re-encoding, by the server, the second original data file into a second bit rate reduction data file if the instant-transmission index is not found according to the second original data file; and storing, by the server, the second original data file and the second bit rate reduction data file into the storage warehouse, and updating association information of the fileid of the second original data file and a fileid of the second bit rate reduction data file to the instant- transmission index.

9. The server according to claim 6, wherein the querying, by the server, for an instant-transmission index according to the upload application request comprises:

obtaining, by the server, a message digest algorithm 5 (MD5) value of the first original data file; and querying, by the server, the storage warehouse for the instant-transmission index according to the MD5 value of the first original data file.

10. The server according to claim 6, wherein the plurality of operations further comprise:

after querying, by the server, for an instant-transmission index according to the upload application request:

allocating, by the server, a third fileid to the first original data file if the instant-transmission index is not found according to the upload application request, and returning the third fileid to the first client;

receiving, by the server, the first original data file that is sent by the first client according to the third fileid, and re-encoding the first original data file into the first bit rate reduction data file;

storing, by the server, the first original data file and the first bit rate reduction data file into a storage warehouse, and updating association information of the third fileid of the first original data file and the second fileid of the first bit rate reduction data file to the instant-transmission index; and sending, by the server, an upload success instruction to the first client, wherein the upload success instruction comprises the second fileid.

11. A non-transitory computer readable storage medium storing a plurality of machine readable instructions in connection with a server having one or more processors, wherein the plurality of machine readable instructions, when executed by the one or more processors, cause the server to perform a plurality of operations including:

receiving, by the server, an upload application request sent by a first client, the upload application request being used to request to upload a first original data file to the server and generated in response to a request by a first user at the first client to share the first original data file with a second user at a second client, wherein the first user and the second user each have a user account at a social networking platform;

querying, by the server, for an instant-transmission index according to the upload application request, the instant-transmission index being used to record association information of file identifiers (fileids) of a plurality of original data files, including a first original data file and a second original data file, and fileids of corresponding bit rate reduction data files, including querying a storage warehouse that stores the instant-transmission index whether the first original data file is already stored in the storage warehouse and has a corresponding first bit rate reduction data file having similar content as the first original data file but having a smaller file size than the first original data file, wherein the first original data file and the corresponding first bit rate reduction data file are recorded as being associated in the instant-transmission index;

sending, by the server, a first instant-transmission hit instruction to the first client when the instant-transmission index records association information of a first fileid of the first original data file and a second fileid of the corresponding first bit rate reduction data file, the first instant-transmission hit instruction comprising the second fileid, wherein the first client sends the second fileid to the second client;

receiving, by the server, a first download application request sent by the second client, the first download application request comprising the second fileid obtained by the second client from the first client;

obtaining, by the server, the first bit rate reduction data file according to the second fileid, and sending the first bit rate reduction data file to the second client;

before receiving, by the server, the upload application request sent by a first client:

obtaining, by the server, the plurality of original data files from a data file library;

re-encoding, by the server, the plurality of original data files respectively, to obtain a plurality of bit rate reduction data files;

storing, by the server, the plurality of original data files and the plurality of bit rate reduction data files into a storage warehouse, and updating association information of the fileids of the plurality of original data files and the fileids of the corresponding bit rate reduction data files to the instant-transmission index;

after querying, by the server, for an instant-transmission index according to the upload application request:

sending, by the server, a second instant-transmission hit instruction to the first client if the instant-transmission index records the first fileid of the first original data file and a first bit rate reduction data file corresponding to the first original data file does not exist in the storage warehouse, wherein the second instant-transmission hit instruction comprises the first fileid, and the first client sends the first fileid to the second client;

receiving, by the server, a second download application request sent by the second client, wherein the second download application request comprises the first fileid obtained by the second client; and obtaining, by the server, the first original data file from the storage warehouse according to the first fileid, and sending the first original data file to the second client.

12. The non-transitory computer readable storage medium according to claim 11, wherein the plurality of operations further comprise:

obtaining, by the server, a second original data file from the data file library;

querying, by the server, the storage warehouse for the instant-transmission index according to the second original data file;

discarding, by the server, the second original data file if the instant-transmission index records a fileid of the second original data file, and continuing to obtain a third original data file from the data file library;

re-encoding, by the server, the second original data file into a second bit rate reduction data file if the instant-transmission index is not found according to the second original data file; and storing, by the server, the second original data file and the second bit rate reduction data file into the storage warehouse, and updating association information of the fileid of the second original data file and a fileid of the second bit rate reduction data file to the instant-transmission index.

13. The non-transitory computer readable storage medium according to claim 11, wherein the querying, by the server, for an instant-transmission index according to the upload application request comprises:

obtaining, by the server, a message digest algorithm 5 (MD5) value of the first original data file; and querying, by the server, the storage warehouse for the instant-transmission index according to the MD5 value of the first original data file.

14. The non-transitory computer readable storage medium according to claim 11, wherein the plurality of operations further comprise:

after querying, by the server, for an instant-transmission index according to the upload application request:

allocating, by the server, a third fileid to the first original data file if the instant-transmission index is not found according to the upload application request, and returning the third fileid to the first client;

receiving, by the server, the first original data file that is sent by the first client according to the third fileid, and re-encoding the first original data file into the first bit rate reduction data file;

storing, by the server, the first original data file and the first bit rate reduction data file into a storage warehouse, and updating association information of the third fileid of the first original data file and the second fileid of the first bit rate reduction data file to the instant-transmission index; and sending, by the server, an upload success instruction to the first client, wherein the upload success instruction comprises the second fileid.

* * * * *